US012738221B2

(12) United States Patent
Lu et al.

(10) Patent No.: US 12,738,221 B2
(45) Date of Patent: Sep. 15, 2026

(54) PIXEL CIRCUIT AND METHOD FOR DRIVING THE SAME AND DISPLAY PANEL

(71) Applicant: Yungu (Gu'an) Technology Co., Ltd., Langfang (CN)

(72) Inventors: Jianjun Lu, Langfang (CN); Cuili Gai, Langfang (CN); Enqing Guo, Langfang (CN); Shuang Guo, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 19/068,022

(22) Filed: Mar. 3, 2025

(65) Prior Publication Data

US 2025/0201193 A1 Jun. 19, 2025

(30) Foreign Application Priority Data

Mar. 18, 2024 (CN) ........................ 202410304141.6

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01)

(58) Field of Classification Search
CPC .. G09G 3/3233; G09G 3/3225; G09G 3/3208; G09G 2320/0233; G09G 2300/0819
See application file for complete search history.

(56) References Cited

U.S. PATENT DOCUMENTS

| | | | | |
|---|---|---|---|---|
| 10,916,197 | B1 * | 2/2021 | Zhang | G09G 3/3258 |
| 2020/0302860 | A1 * | 9/2020 | Kim | G09G 3/325 |
| 2024/0339077 | A1 * | 10/2024 | Li | G09G 3/3208 |

FOREIGN PATENT DOCUMENTS

| | | | | | |
|---|---|---|---|---|---|
| CN | 116825031 | A | | 9/2023 | |
| CN | 116844473 | A | * | 10/2023 | G09G 3/3208 |
| CN | 116959378 | A | | 10/2023 | |
| CN | 117253451 | A | | 12/2023 | |
| CN | 114999364 | B | * | 6/2025 | G09G 3/20 |

* cited by examiner

*Primary Examiner* — Xuemei Zheng
(74) *Attorney, Agent, or Firm* — Kilpatrick Townsend & Stockton LLP

(57) ABSTRACT

The present application discloses a pixel circuit and a method for driving the same, a display panel, and a display apparatus. The pixel circuit includes a drive module, where the drive module includes a first transistor and a second transistor connected in parallel, a first terminal of the first transistor and a first terminal of the second transistor are connected to form a first end of the drive module, a second terminal of the first transistor and a second terminal of the second transistor are connected to each other as a second end of the drive module, a first gate of the first transistor and a second gate of the second transistor are connected to each other to form a control end of the drive module, and a subthreshold swing of the first transistor is greater than a subthreshold swing of the second transistor.

18 Claims, 9 Drawing Sheets

Generate, by both a first dual-gate transistor and a second dual-gate transistor, drive currents in a light emitting stage, to drive a light emitting module to emit light, where during display of a first gray scale, the drive current generated in the first dual-gate transistor is greater than the drive current generated in the second dual-gate transistor, during display of a second gray scale, the drive current generated in the first dual-gate transistor is less than the drive current generated in the second dual-gate transistor, and a gray scale value of the first gray scale is less than a gray scale value of the second gray scale

91

Figure 9

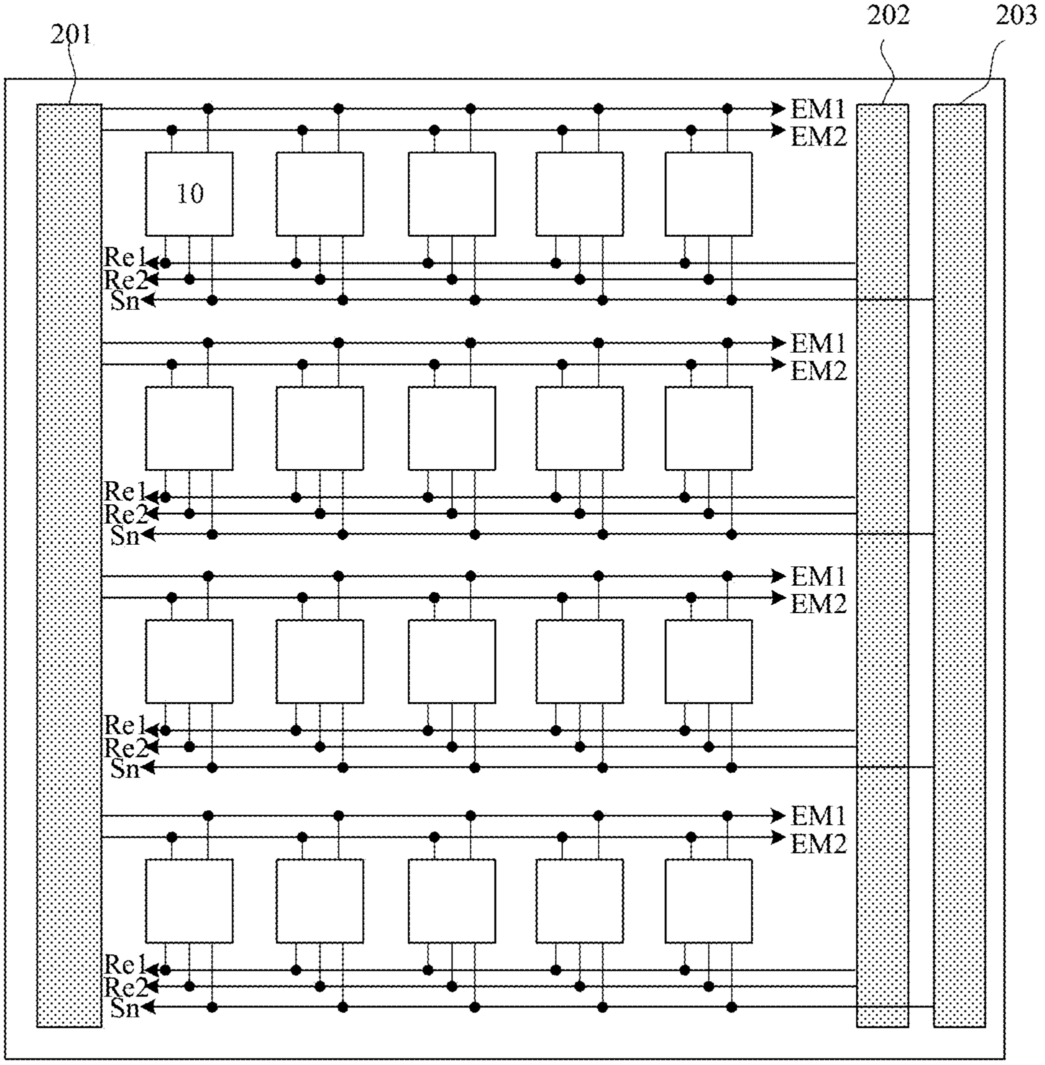

100

Figure 10

PIXEL CIRCUIT AND METHOD FOR DRIVING THE SAME AND DISPLAY PANEL

CROSS-REFERENCE TO RELATED APPLICATIONS

The present application claims priority to the Chinese Patent Application 202410304141.6, filed on Mar. 18, 2024, and the entire contents of the aforementioned application are hereby incorporated by reference in its entirety.

FIELD

The present application relates to the field of display technologies, and in particular to a pixel circuit and a method for driving the same, and a display panel.

BACKGROUND

Organic light emitting diodes (OLEDs) and flat panel display apparatuses based on technologies such as light emitting diodes (LEDs) have been widely applied to various consumer electronics such as mobile phones, televisions, notebook computers, and desktop computers and predominate in display apparatuses due to their advantages such as high image quality, energy efficiency, slim design, and a wide application range.

However, the display performance of current OLED display products still needs improvement.

SUMMARY

Embodiments of the present application provides a pixel circuit and a method for driving the same, and a display panel, which are conducive to the improvement of display performance of a display product.

An embodiment of the present application provides a pixel circuit including a drive module, where the drive module includes a first transistor and a second transistor connected in parallel, a first terminal of the first transistor and a first terminal of the second transistor are connected to form a first end of the drive module, a second terminal of the first transistor and a second terminal of the second transistor are connected to each other as a second end of the drive module, a first gate of the first transistor and a second gate of the second transistor are connected to each other to form a control end of the drive module, and a subthreshold swing of the first transistor is greater than a subthreshold swing of the second transistor.

In one embodiment, the first transistor further includes a third gate disposed opposite the first gate with respect to a channel of the first transistor;

and/or the second transistor further includes a fourth gate disposed opposite the second gate with respect to a channel of the second transistor;

In one embodiment, the first gate of the first transistor is a bottom gate of the first transistor, the third gate of the first transistor is a top gate of the first transistor, the second gate of the second transistor is a top gate of the second transistor, and the fourth gate of the second transistor is a bottom gate of the second transistor;

In one embodiment, the third gate of the first transistor is connected to the second terminal of the first transistor, and/or the fourth gate of the second transistor is connected to the second terminal of the second transistor;

In one embodiment, an insulating layer between the first gate of the first transistor and an active layer of the first transistor has a thickness of d1, an insulating layer between the second gate of the second transistor and an active layer of the second transistor has a thickness of d2, and d1>d2; and In one embodiment, a width-to-length ratio of the channel of the first transistor is less than a width-to-length ratio of the channel of the second transistor.

In one embodiment, the pixel circuit further includes a compensation module, where the compensation module is connected between the control end and the first end of the drive module and is configured to transmit a data voltage of the first end of the drive module to the control end of the drive module in a data writing stage and compensate for a threshold voltage of the drive module in a compensation stage;

In one embodiment, a product of a channel width and a channel length of the first transistor is A1, a product of a channel width and a channel length of the second transistor is A2, the compensation module includes a third transistor, a product of a channel width and a channel length of the third transistor is A3, where A1<A3, and/or A2<A3;

In one embodiment, A3 is 2 to 3 times A1 and/or A3 is 2 to 3 times A2;

In one embodiment, the pixel circuit further includes a storage module and a coupling module, where the storage module is connected between the control end of the drive module and a first end of a light emitting module and is configured to store a voltage of the control end of the drive module; the coupling module is connected to the first end of the drive module and is configured to couple the data voltage to the first end of the drive module; and In one embodiment, the storage module includes a first capacitor, the coupling module includes a second capacitor, and capacitance of the first capacitor is less than capacitance of the second capacitor.

In one embodiment, the pixel circuit further includes a data writing module, a first reset module, a second reset module, a third reset module, and the light emitting module, where

- the first reset module is connected to a first end of the coupling module and is configured to reset the first end of the coupling module in a reset stage;
- the data writing module is connected to the first end of the coupling module and is configured to write the data voltage to the first end of the coupling module in the data writing stage;
- a second end of the coupling module is connected to the first end of the drive module, and the coupling module is configured to couple the data voltage to the first end of the drive module;
- the second reset module is connected between the second end of the drive module and a first reset signal line and is configured to be turned on in the compensation stage for threshold compensation;
- the third reset module is connected between the first end of the light emitting module and a second reset signal line and is configured to reset the first end of the light emitting module;
- In one embodiment, a voltage of the first reset signal line is greater than a voltage of the second reset signal line;
- In one embodiment, a control end of the first reset module and a control end of the second reset module are connected to a first scan signal;
- a control end of the compensation module is connected to a second scan signal;

a control end of the data writing module is connected to a third scan signal;

a control end of the third reset module is connected to the second scan signal;

In one embodiment, the control end of the third reset module is connected to a fourth scan signal;

In one embodiment, in a first mode, a refresh rate of the fourth scan signal is greater than a refresh rate of the second scan signal and a refresh rate of the third scan signal;

In one embodiment, the third reset module includes a first sub-module and a second sub-module connected in parallel, where a first end of the first sub-module is connected to a first end of the second sub-module, a second end of the first sub-module is connected to a second end of the second sub-module, a control end of the first sub-module is connected to the second scan signal, and a control end of the second sub-module is connected to the third scan signal; and In one embodiment, in the first mode, the refresh rate of the third scan signal is greater than the refresh rate of the second scan signal.

In one embodiment, the pixel circuit further includes a first light-emission control module and a second light-emission control module, where the first light-emission control module is connected between the first end of the drive module and a first power supply end and is configured to reset the control end of the drive module in the reset stage and write a voltage of the first power supply end to the drive module in a light emitting stage;

the second light-emission control module is connected between the second end of the drive module and the first end of the light emitting module and is configured to control the light emitting module to emit light in the light emitting stage;

a control end of the first light-emission control module is connected to a first light-emission control signal; and a control end of the second light-emission control module is connected to a second light-emission control signal.

In one embodiment, the compensation module includes the third transistor, the second reset module includes a fourth transistor, the data writing module includes a fifth transistor, the first reset module includes a sixth transistor, the first light-emission control module includes an eighth transistor, and the second light-emission control module includes a ninth transistor; and the third reset module includes a seventh transistor, or, the first sub-module includes a seventh transistor, and the second sub-module includes a tenth transistor.

An embodiment of the present application further provides a method for driving a pixel circuit, applied to the pixel circuit as described in any one of the embodiments. The method for driving a pixel circuit provided in this embodiment of the present application includes:

generating, by both a first transistor and a second transistor, drive currents in a light emitting stage, to drive a light emitting module to emit light, where during display of a first gray scale, the drive current generated in the first transistor is greater than the drive current generated in the second transistor, during display of a second gray scale, the drive current generated in the first transistor is less than the drive current generated in the second transistor, and a gray scale value of the first gray scale is less than a gray scale value of the second gray scale;

In one embodiment, a duration of a reset stage of the pixel circuit is less than or equal to a duration of a data writing stage;

In one embodiment, the duration of the reset stage is less than a duration of a compensation stage;

In one embodiment, in a first operating condition, the duration of the reset stage is greater than a first threshold, the duration of the compensation stage is greater than a second threshold, and the first threshold is less than the second threshold; and In one embodiment, in a second operating condition, the duration of the reset stage is less than the first threshold.

An embodiment of the present application further provides a display panel including the pixel circuit as described in any one of the embodiments.

In one embodiment, a control end of a first reset module and a control end of a second reset module are connected to a first scan signal;

a control end of a compensation module is connected to a second scan signal;

a control end of a data writing module is connected to a third scan signal;

a control end of a first light-emission control module is connected to a first light-emission control signal;

a control end of a second light-emission control module is connected to a second light-emission control signal;

a control end of a third reset module is connected to the second scan signal;

In one embodiment, the display panel includes a first gate driving circuit, a second gate driving circuit, and a third gate driving circuit, the first gate driving circuit is configured to provide the first light-emission control signal and the second light-emission control signal, the second gate driving circuit is configured to provide the first scan signal and the second scan signal, and the third gate driving circuit is configured to provide the third scan signal;

In one embodiment, the control end of the third reset module is connected to a fourth scan signal;

In one embodiment, the display panel includes a fourth gate driving circuit, a fifth gate driving circuit, a sixth gate driving circuit, and a seventh gate driving circuit, the fourth gate driving circuit is configured to provide the first light-emission control signal and the second light-emission control signal, the fifth gate driving circuit is configured to provide the first scan signal and the second scan signal, the sixth gate driving circuit is configured to provide the third scan signal, and the seventh gate driving circuit is configured to provide the fourth scan signal; or, the display panel includes an eighth gate driving circuit, a ninth gate driving circuit, a tenth gate driving circuit, and an eleventh gate driving circuit, the eighth gate driving circuit is configured to provide the first light-emission control signal and the second light-emission control signal, the ninth gate driving circuit is configured to provide the first scan signal and the fourth scan signal, the tenth gate driving circuit is configured to provide the second scan signal, and the eleventh gate driving circuit is configured to provide the third scan signal;

In one embodiment, the third reset module includes a first sub-module and a second sub-module connected in parallel, a control end of the first sub-module is connected to the second scan signal, and a control end of the second sub-module is connected to the third scan signal; and In one embodiment, the display panel includes a twelfth gate driving circuit, a thirteenth gate driving circuit, and a fourteenth gate driving circuit, the twelfth gate driving circuit is configured to provide the first light-emission control signal and the second light-emission control signal, the thirteenth gate driving circuit is configured to provide the first scan signal and the second scan signal, and the fourteenth gate driving circuit is configured to provide the third scan signal.

An embodiment of the present application further provides a display apparatus including the display panel as described in any one of the embodiments.

According to the pixel circuit and the method for driving the same, the display panel, and the display apparatus provided in the embodiments of the present application, the drive module includes two transistors that are connected in parallel and that have different subthreshold swings, where the subthreshold swing of the first transistor is larger, and the subthreshold swing of the second transistor is smaller. During display of a low gray scale picture, the first transistor provides a main current, that is, the drive current provided by the first transistor is greater than the drive current provided by the second transistor, which is conducive to achieving good brightness uniformity at a low gray scale. During display of a high gray scale picture, the second transistor provides a main current, that is, the drive current provided by the second transistor is greater than the drive current provided by the first transistor, which is conducive to achieving a high brightness effect corresponding to a high gray scale.

The above description is merely a summary of the embodiments of the present application. To make the embodiments of the present application more clearly understood and implemented according to the contents of the specification, and to make the above embodiments of the present application more clear and comprehensible, the embodiments of the present application are described in detail below.

BRIEF DESCRIPTION OF DRAWINGS

Embodiments of the present application will become more clear upon reading the following detailed description of non-limiting embodiments with reference to the accompanying drawings, where identical or similar reference signs indicate identical or similar features and the drawings are not necessarily drawn to scale.

FIG. 9 is a schematic flowchart of a method for driving a pixel circuit according to an embodiment of the present application;

FIG. 10 is a schematic top view of a structure of a display panel according to an embodiment of the present application;

LIST OF REFERENCE SIGNS

Figure 1:
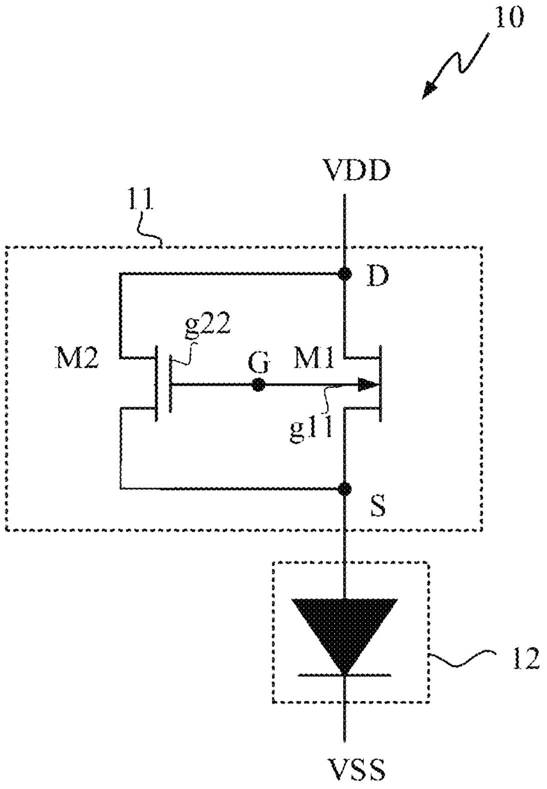
FIG. 1 is a schematic diagram of a structure of a pixel circuit according to an embodiment of the present application.

10: pixel circuit;
11: drive module; 12: light emitting module;
01: substrate;
13: storage module; 14: coupling module; 15: compensation module; 16: data writing module;
171: first reset module; 172: second reset module; 173: third reset module;
181: first light-emission control module; 182: second light-emission control module;
100: display panel;
201: first gate driving circuit; 202: second gate driving circuit; 203: third gate driving circuit; 204: fourth gate driving circuit; 205: fifth gate driving circuit; 206: sixth gate driving circuit; 207: seventh gate driving circuit; 208: eighth gate driving circuit; 209: ninth gate driving circuit; 210: tenth gate driving circuit; 211: eleventh gate driving circuit; 212: twelfth gate driving circuit; 213: thirteenth gate driving circuit; and
1000: display apparatus.

DETAILED DESCRIPTION

Features and exemplary embodiments of the present application will be described in detail below. In order to make the embodiments of the present application clearer, the present application is further described in detail below with reference to the accompanying drawings and embodiments. It should be understood that the specific embodiments described herein are merely configured to explain the present application and are not configured to limit the present application. The present application may be implemented without some of these specific details. The following description of the embodiments is merely to provide a better understanding of the present application by illustrating examples of the present application.

It should be noted that, herein, relative terms such as "first" and "second" are only used to distinguish one entity or operation from another entity or operation, and do not necessarily require or imply that such an actual relationship or order exists between these entities or operations. Moreover, the terms "include", "comprise", or any other variants thereof are intended to cover a non-exclusive inclusion, and a process, a method, an article, or a device that includes a list of elements not only includes those elements but also includes other elements that are not listed, or further includes elements inherent to such a process, method, article, or device. If no more limitations are made, an element limited by "comprising . . . " does not exclude other identical elements existing in the process, the method, the article, or the device which includes the element.

It should be understood that in the description of the structure of a component, a layer or region referred as being located "above" or "over" another layer or region may be directly on the other layer or region, or there may be other layers or regions between it and the other layer or region. Moreover, if the component is turned over, the layer or region will be located "below" or "under" the other layer or region.

It should be understood that the term "and/or" herein is merely the description of an association between associated objects, and indicates that three relationships may exist. For example, A and/or B may indicate that only A exists, both A and B exist, and only B exists. In addition, the character "/" herein generally indicates that an "or" relationship between associated objects.

In the description of the present application, it should be noted that unless otherwise explicitly specified and defined, the terms "mounting", "connecting", "connection", and "attaching" should be understood in a broad sense, for example, they may be a fixed connection, a detachable connection, or an integrated connection; may be a direct connection, may be an indirect connection via an intermediate medium, or may be communication between the interiors of two elements. It is understood that the specific meanings of the foregoing terms in the present application according to specific circumstances.

Various modifications and variations can be made in the present application without departing from the spirit or scope of the present application. Therefore, the present application aims to cover the modifications and variations that fall within the scope of the corresponding claims (the claimed embodiments) and equivalents thereof. It should be noted that implementations provided in the embodiments of the present application may be combined with each other without contradiction.

Taking an active matrix organic light emitting diode display product as an example, a light emitting device can be current-driven to emit light, in which case device characteristics of thin film transistors (TFTs) in a pixel circuit directly affect a difference in gray scale brightness of the display product. In particular, a significant difference between the characteristics of the TFT devices easily results in nonuniformity in picture quality, such as mura (i.e., brightness nonuniformity).

In view of the above problem, an embodiment of the present application provides a pixel circuit and a method for driving the same, a display panel, and a display apparatus. Various embodiments of the present application will be described below with reference to the drawings.

As shown in FIG. 1, the pixel circuit 10 includes a drive module 11, where the drive module 11 includes a first transistor M1 and a second transistor M2 connected in parallel, a first terminal of the first transistor M1 and a first terminal of the second transistor M2 are connected to form a first end of the drive module 11, a second terminal of the first transistor M1 and a second terminal of the second transistor M2 are connected to each other as a second end of the drive module 11, a first gate g11 of the first transistor M1 and a second gate g22 of the second transistor M2 are connected to each other to form a control end of the drive module 11, and a subthreshold swing (SS) of the first transistor M1 is greater than a subthreshold swing of the second transistor M2. For ease of understanding, FIG. 1 shows that the control end of the drive module 11 is connected to a node G, the first end of the drive module 11 is connected to a node D, and the second end of the drive module 11 is connected to a node S.

For example, the first end of the drive module 11 may be electrically connected to a first power supply end VDD, the second end of the drive module 12 may be electrically connected to a first end of a light emitting module 12, and a second end of the light emitting module 12 may be electrically connected to a second power supply end VSS. The control end of the drive module 11 may be connected to a data voltage Vdata, and the drive module 11 may generate a drive current based on the data voltage Vdata, to drive the light emitting module 12 to emit light.

According to the pixel circuit provided in this embodiment of the present application, the drive module 11 includes two transistors that are connected in parallel and that have different subthreshold swings, where the SS of the first transistor M1 is larger, and the SS of the second transistor is smaller. During display of a low gray scale picture, the first transistor M1 provides a main current, that is, the drive current provided by the first transistor M1 is greater than the drive current provided by the second transistor M2, which is conducive to achieving good brightness uniformity at a low gray scale. During display of a high gray scale picture, the second transistor M2 provides a main current, that is, the drive current provided by the second transistor M2 is greater than the drive current provided by the first transistor M1, which is conducive to achieving a high brightness effect corresponding to a high gray scale.

Figure 2:
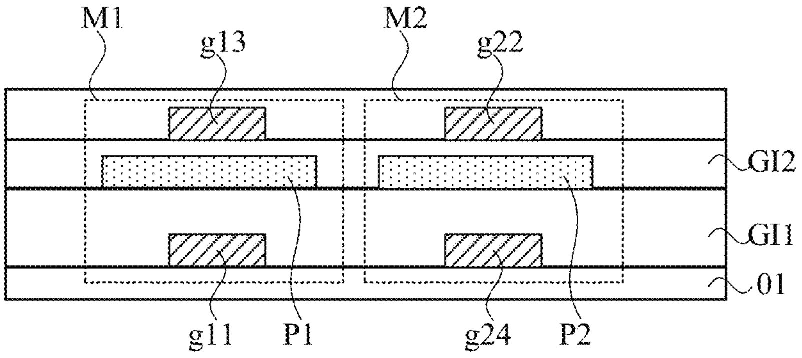
FIG. 2 is a schematic diagram of a cross-sectional structure of a transistor in a pixel circuit according to an embodiment of the present application.
Figure 3:
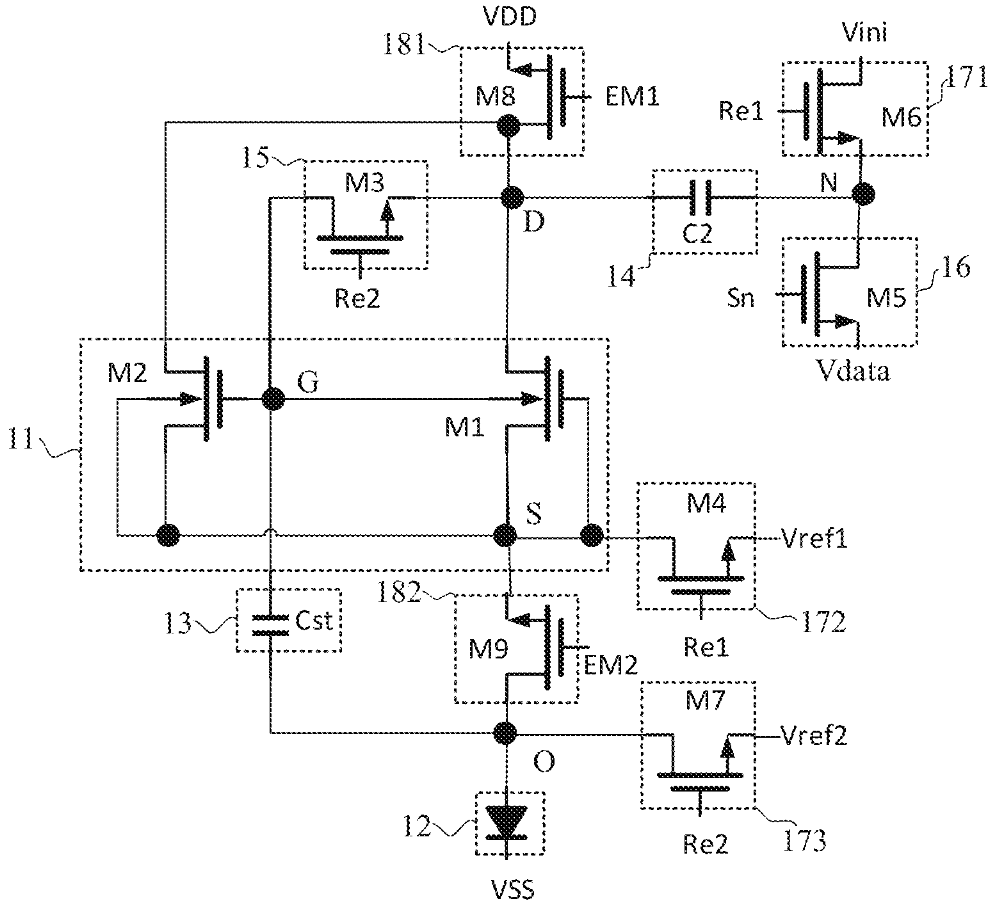
FIG. 3 is a schematic diagram of another structure of a pixel circuit according to an embodiment of the present application.

In some embodiments, with combined reference to FIGS. 2 and 3, the first transistor M1 may further include a third gate g13 disposed opposite the first gate g11 with respect to a channel of the first transistor M1. The third gate g13 may shade the channel of the first transistor M1. Of course, when a lighting effect is not considered, the third gate g13 may not be provided. The third gate g13 is a metal film, the position of which may be set according to an actual situation.

In one embodiment, the second transistor M2 may further include a fourth gate g24 disposed opposite the second gate g22 with respect to a channel of the second transistor M2. The fourth gate g24 may shade the channel of the second transistor M2. Of course, when a lighting effect is not considered, the fourth gate g24 may not be provided. The fourth gate g24 is a metal film, the position of which may be set according to an actual situation.

As shown in FIG. 2, in some embodiments, when the first transistor M1 further includes the third gate g13, the third gate g13 of the first transistor M1 is connected to the second terminal of the first transistor M1. One gate of the first transistor M1, which is a four-end device, is connected to the second terminal of the first transistor M1, to stabilize a threshold voltage of the first transistor, which is more conducive to achieving the brightness uniformity.

In one embodiment, when the second transistor M2 further includes the fourth gate g24, the fourth gate g21 of the second transistor M2 is connected to the second terminal of the second transistor M2. One gate of the second transistor M2, which is a four-end device, is connected to the second terminal of the second transistor M2, to stabilize a threshold voltage of the second transistor, which is more conducive to achieving the brightness uniformity.

In some embodiments, the first gate g11 of the first transistor M1 is a bottom gate thereof, the third gate g13 of the first transistor M1 is a top gate thereof, the fourth gate g24 of the second transistor M2 is a bottom gate thereof, and the second gate g22 of the second transistor M2 is a top gate thereof.

A transistor includes an active layer, where a gate located above the active layer is a top gate of the transistor, and a gate located below the active layer is a bottom gate of the transistor.

As shown in FIG. 2, the first transistor M1 and the second transistor M2 may be located on a substrate 01. The first transistor M1 includes a first active layer P1, where the first gate g11 of the first transistor M1 is located on a side of the first active layer P1 that is close to the substrate 01, and the third gate g13 of the first transistor M1 is located on a side of the first active layer P1 that is away from the substrate 01. The second transistor M2 includes a second active layer P2, where the fourth gate g24 of the second transistor M2 is located on a side of the second active layer P2 that is close to the substrate 01, and the second gate g22 of the second transistor M2 is located on a side of the second active layer P2 that is away from the substrate 01.

A first gate insulating layer GI1 may be provided between the active layer and the bottom gate of the transistor, and a second gate insulating layer GI2 may be provided between the active layer and the top gate of the transistor.

The first gate g11 of the first transistor M1 and the second gate g22 of the second transistor M2 are connected to each other as the control end of the drive module 11. The thickness, d1, of an insulating layer between the first gate g11 and the first active layer P1 affects the subthreshold swing of the first transistor M1, and the thickness, d2, of an insulating layer between the second gate g22 and the second active layer P2 affects the subthreshold swing of the second transistor M2. The larger the thickness of the insulating layer between the gate acting as the control end and the active layer, the larger the subthreshold swing of the transistor, and the smaller the thickness of the insulating layer between the gate acting as the control end and the active layer, the smaller the subthreshold swing of the transistor. In some embodiments, d1>d2, and the subthreshold swing of the first transistor M1 is greater than the subthreshold swing of the second transistor M2.

The first active layer P1 of the first transistor M1 and the second active layer P2 of the second transistor M2 may be located in the same film, the first gate g11 of the first transistor M1 and the fourth gate g24 of the second transistor M2 may be located in the same film, and the third gate g13 of the first transistor M1 and the second gate g22 of the second transistor M2 may be located in the same film. As such, the bottom gate of the first transistor M1 and the top gate of the second transistor M2 are selected as the control end of the drive module, to facilitate the preparation of the first gate insulating layer GI1 and the second gate insulating layer GI2 of different thicknesses, resulting in the first transistor M1 and the second transistor M2 of different subthreshold swings.

The inventor has found that a width-to-length ratio of a channel of the transistor also affects a subthreshold swing of the transistor. For example, the larger the width-to-length ratio of the channel of the transistor, the smaller the subthreshold swing, and conversely, the smaller the width-to-length ratio of the channel of the transistor, the larger the subthreshold swing.

In some embodiments, a width-to-length ratio of the channel of the first transistor M1 is less than a width-to-length ratio of the channel of second transistor M2, and the subthreshold swing of first transistor M1 is greater than the subthreshold swing of second transistor M2.

In some embodiments, the pixel circuit may further include a compensation module 15, where the compensation module 15 is connected between the control end and the first end of the drive module 11 and is configured to transmit a data voltage of the first end of the drive module 11 to the control end of the drive module 11 in a data writing stage and to compensate for a threshold voltage of the drive module 11 in a compensation stage.

The first transistor M1 and the second transistor M2 have parasitic capacitance per se, and the parasitic capacitance affects potential stability of the control end of the drive module 11 in a light emitting stage. The parasitic capacitance of the first transistor M1 and/or the second transistor M2 may be reduced by controlling a product of a channel width and a channel length of the first transistor M1 and/or the second transistor M2 to be smaller.

For example, the product of the channel width and the channel length of the first transistor M1 is A1, the product of the channel width and the channel length of the second transistor M2 is A2, the compensation module 15 includes a third transistor M3, a product of a channel width and a channel length of the third transistor M3 is A3, where A1<A3, and/or A2<A3.

As an example, A3 is 2 to 3 times A1 and/or A3 is 2 to 3 times A2.

Of course, in other examples, a number-of-times relationship between A1, A2, and A3 may be designed according to an actual demand.

In some embodiments, as shown in FIG. 3, the pixel circuit 10 further includes a storage module 13 and a coupling module 14.

The storage module 13 is connected between the control end of the drive module 11 and the first end of the light emitting module 11 and is configured to store a voltage of the control end of the drive module 11. The coupling module 14 is connected to the first end of the drive module 11 and is configured to couple the data voltage Vdata to the first end of the drive module 11.

The memory module 13 includes a first capacitor Cst, the coupling module 14 includes a second capacitor C2, and capacitance of the first capacitor Cst is less than capacitance of the second capacitor C2. As such, an impact of a voltage drop (IR drop) of the second power supply end VSS on display brightness can be alleviated.

For example, the capacitance of the first capacitor Cst may be ½ to ¾ of the capacitance of the second capacitor C2. Of course, in other examples, a number-of-times relationship between the capacitance of the first capacitor Cst and the capacitance of the second capacitor C2 may be designed according to an actual demand.

In some embodiments, with continued reference to FIG. 3, the pixel circuit 10 further includes a data writing module 16, a first reset module 171, a second reset module 142, and a third reset module 173.

The first reset module 171 is connected to a first end of the coupling module 14 and is configured to reset the first end of the coupling module 14 in a reset stage. The first reset module 171 is configured to transmit an initialization voltage *Vini.*

The data writing module 16 is connected to the first end of the coupling module 14 and is configured to write the data voltage Vdata to the first end of the coupling module 14 in the data writing stage.

A second end of the coupling module 14 is connected to the first end of the drive module 11, and the coupling module 14 is configured to couple the data voltage Vdata to the first end of the drive module 11.

The second reset module 172 is connected between the second end of the drive module 11 and a first reset signal line Vref1 and is configured to be turned on in the compensation stage for threshold compensation.

The third reset module 173 is connected between the first end of the light emitting module 12 and a second reset signal line Vref2 and is configured to reset the first end of the light emitting module 12.

For example, in the compensation stage, the first transistor M1, the second transistor M2, the compensation module 15, and the second reset module 172 may be turned on, and the node G discharges to the first reset signal line Vref1 via the compensation module 15, the first transistor M1, the second transistor M2, and the second reset module 172.

For example, a voltage of the first reset signal line Vref1 may be greater than a voltage of the second reset signal line Vref2, which is conducive to reducing a voltage difference between the node G and the first reset signal line Vref1 in the compensation stage, to facilitate the saving of power consumption.

In some examples, a control end of the first reset module 171 and a control end of the second reset module 172 may both be connected to a first scan signal Re1, and the number of scan signals may be reduced, which is conducive to achieving a narrow bezel of the display product.

In some examples, a control end of the compensation module 15 is connected to a second scan signal Re2, and a control end of the data writing module 16 is connected to a third scan signal Sn. The coupling module 14 is disposed between the data writing module 16 and the control end of the drive module 11, and the compensation module 15 and the data writing module 16 are controlled with different scan signals, which is conducive to separation of threshold voltage compensation from data voltage writing, and threshold compensation time is not limited by row scanning time, facilitating more sufficient threshold compensation and to improve the display uniformity.

As an example, as shown in FIG. 3, a control end of the third reset module 173 is connected to the second scan signal Re2. That is, the compensation module 15 and the third reset module 173 are controlled with the same scan signal, and the number of scan signals may be reduced, which is conducive to achieving the narrow bezel of the display product.

In some embodiments, as shown in FIG. 3, the pixel circuit 10 further includes a first light-emission control module 181 and a second light-emission control module 182. The first light-emission control module 181 is connected between the first end of the drive module 11 and the first power supply end VDD and is configured to reset the control end of the drive module 11 in the reset stage and write a voltage of the first power supply end VDD to the drive module 11 in the light emitting stage. The second light-emission control module 182 is connected between the second end of the drive module 11 and the first end of the light emitting module 12 and is configured to control the light emitting module 12 to emit light in the light emitting stage.

A control end of the first light-emission control module 181 and a control end of the second light-emission control module 182 may be connected to different light-emission control signals. For example, the control end of the first light-emission control module 181 is connected to a first light-emission control signal EM1, and the control end of the second light-emission control module 182 is connected to a second light-emission control signal EM2. The first light-emission control signal EM1 controls the first light-emission control module 181 to be turned on in the reset stage, and the voltage of the first power supply end VDD is written to the control end of the drive module 11, to reset the control end of the drive module 11. The first light-emission control signal EM1 controls the first light-emission control module 181 to be on in the light emitting stage, the second light-emission control signal EM2 controls the second light-emission control module 182 to be turned on in the light emitting stage, and the drive module 11 generates the drive current to drive the light emitting module 12 to emit light.

In some embodiments, as shown in FIG. 3, the compensation module 15 includes the third transistor M3, where a gate of the third transistor M3 acts as the control end of the compensation module 15, a first terminal of the third transistor M3 acts as a first end of the compensation module 15, and a second terminal of the third transistor M3 acts as a second end of the compensation module 15.

The second reset module 172 includes a fourth transistor M4, where a gate of the fourth transistor M4 acts as the control end of the second reset module 172, a first terminal of the fourth transistor M4 acts as a first end of the second reset module 172, and a second terminal of the fourth transistor M4 acts as a second end of the second reset module 172.

The data writing module 16 includes a fifth transistor M5, where a gate of the fifth transistor M5 acts as the control end of the data writing module 16, a first terminal of the fifth transistor M5 acts as a first end of the data writing module 16, and a second terminal of the fifth transistor M5 acts as a second end of the data writing module 16.

The first reset module 171 includes a sixth transistor M6, where a gate of the sixth transistor M6 acts as the control end of the first reset module 171, a first terminal of the sixth transistor M6 acts as a first end of the first reset module 171, and a second terminal of the sixth transistor M6 acts as a second end of the first reset module 171.

The third reset module 173 may at least include a seventh transistor M7, where a gate of the seventh transistor M7 acts as the control end of the third reset module 173, a first terminal of the seventh transistor M7 acts as a first end of the third reset module 173, and a second terminal of the seventh transistor M7 acts as a second end of the third reset module 173.

The first light-emission control module 181 includes an eighth transistor M8, where a gate of the eighth transistor M8 acts as the control end of the first light-emission control module 181, a first terminal of the eighth transistor M8 acts as a first end of the first light-emission control module 181, and a second terminal of the eighth transistor M8 acts as a second end of the first light-emission control module 181.

The second light-emission control module 182 includes a ninth transistor M9, where a gate of the ninth transistor M9 acts as the control end of the second light-emission control module 182, a first terminal of the ninth transistor M9 acts as a first end of the second light-emission control module 182, and a second terminal of the ninth transistor M9 acts as a second end of the second light-emission control module 182.

The light emitting module 12 includes a light emitting diode, which may be an OLED.

With combined reference to FIGS. 3 and 4, taking that all the transistors in the pixel circuit are N-type transistors as an example, an operating process of the pixel circuit is described below.

The operating process of the pixel circuit may include the reset stage T1, the compensation stage T2, the data writing stage T3, and the light emitting stage T4.

In the reset stage T1, the first light-emission control signal EM1, the first scan signal Re1, and the second scan signal Re2 are at high levels, the remaining gate control signals are at low levels, the transistors M3, M4, M6, M7, and M8 are turned on, and the remaining transistors are turned off, where potentials of the node G and the node D are equal to a potential of the first power supply end VDD, a potential of the node S is equal to a potential of the first reset signal line Vref1, a potential of a node N is equal to the initialization voltage *Vini*, and a potential of a node O is equal to a potential of the second reset signal line Vref2. A duration of the reset stage T1 may be adjusted according to a demand.

In the compensation stage T2, the first scan signal Re1 and the second scan signal Re2 are at high levels, the remaining gate control signals are at low levels, the transistors M1, M2, M3, M4, and M6 are turned on, and the remaining transistors are off, where electricity of the node G is discharged to the first reset signal line Vref1 via the transistors M3, M1&M2, and M4, to compensate for the threshold voltages of the first transistor M1 and the second transistor M2, until the potential of the node G reaches Vref1+Vth, and the threshold voltage compensation is completed. In addition, in this stage, the potential of the node O is equal to the potential of the second reset signal line Vref2, and the potential of the node N is equal to the initialization voltage Vini. A duration of the compensation stage T2 may also be adjusted according to a demand.

In the data writing stage T3, the second scan signal Re2 and the third scan signal Sn are at high levels, the remaining gate control signals are at low levels, the transistors M3, M5 and M1&M2 are kept on, and the remaining transistors are off, where the data voltage Vdata is transmitted to the node N via the transistor M5 and coupled to the node D via the second capacitor C2. In this case, conduction between the node D and the node G is enabled, and the potential of the node G is equal to Vref1+Vth+k*(data−Vini), where k=C2/(Cst+C2), and Vth is a combined threshold voltage of the first transistor M1 and the second transistor M2. In addition, in this stage, the potential of node O is equal to the potential of the second reset signal line Vref2.

In the light emitting stage T4, the first light-emission control signal EM1 is at a high level, the remaining gate control signals are at low levels, the transistors M1, M2, M8, and M9 are turned on, and the light emitting module 12 emits light.

A formula of the drive current is:

$$I=\frac{1}{2}\mu C_{ox}\frac{W}{L}(Vref1-Vref2+k*(Vdata-Vini))^2$$

where I represents the drive current, p represents combined mobility of the first transistor M1 and the second transistor M2, $C_{ox}$ represents a combined capacitance constant of the first transistor M1 and the second transistor M2, and W/L represents a combined width-to-length ratio of channels of the first transistor M1 and the second transistor M2.

With the development of display technologies, requirements for display scenarios are increasingly diversified. For example, the display product is required to be able to support not only high-refresh-rate driving but also low-refresh-rate driving.

Figure 4:
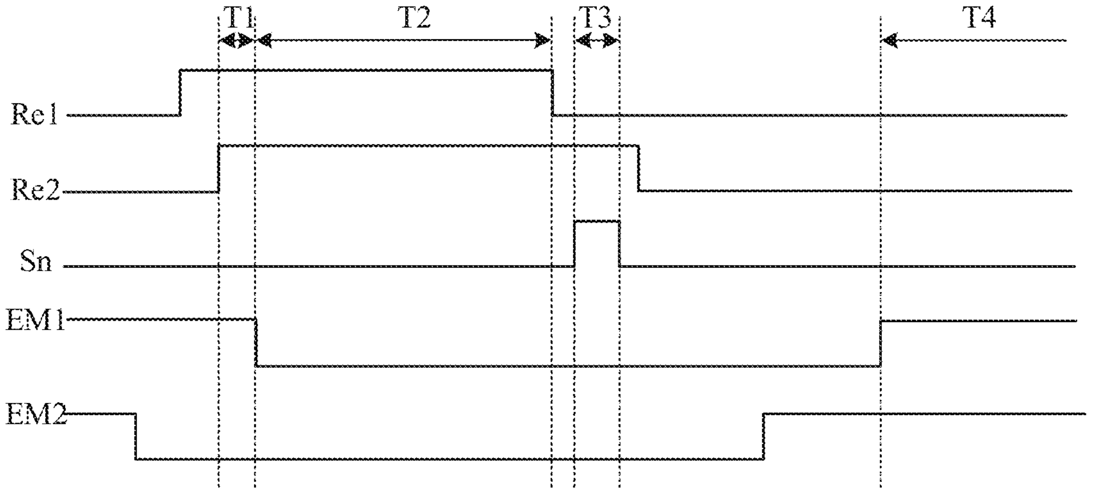
FIG. 4 is a schematic timing diagram of FIG. 3.

In the examples shown in FIGS. 3 and 4, the first light-emission control signal EM1 and the second light-emission control signal EM2 may be provided by a set of gate driving circuit, the first scan signal Re1 and the second scan signal Re2 may be provided by another set of gate driving circuit, and the third scan signal Sn may be provided by yet another set of gate driving circuit. As such, the driving of the pixel circuit may be implemented through three sets of gate driving circuits, which is conducive to narrowing the bezel of the display product. However, refresh rates of gate driving signals are each required to follow a frame rate, making the display product unable to support low-refresh-rate driving.

Figure 5:
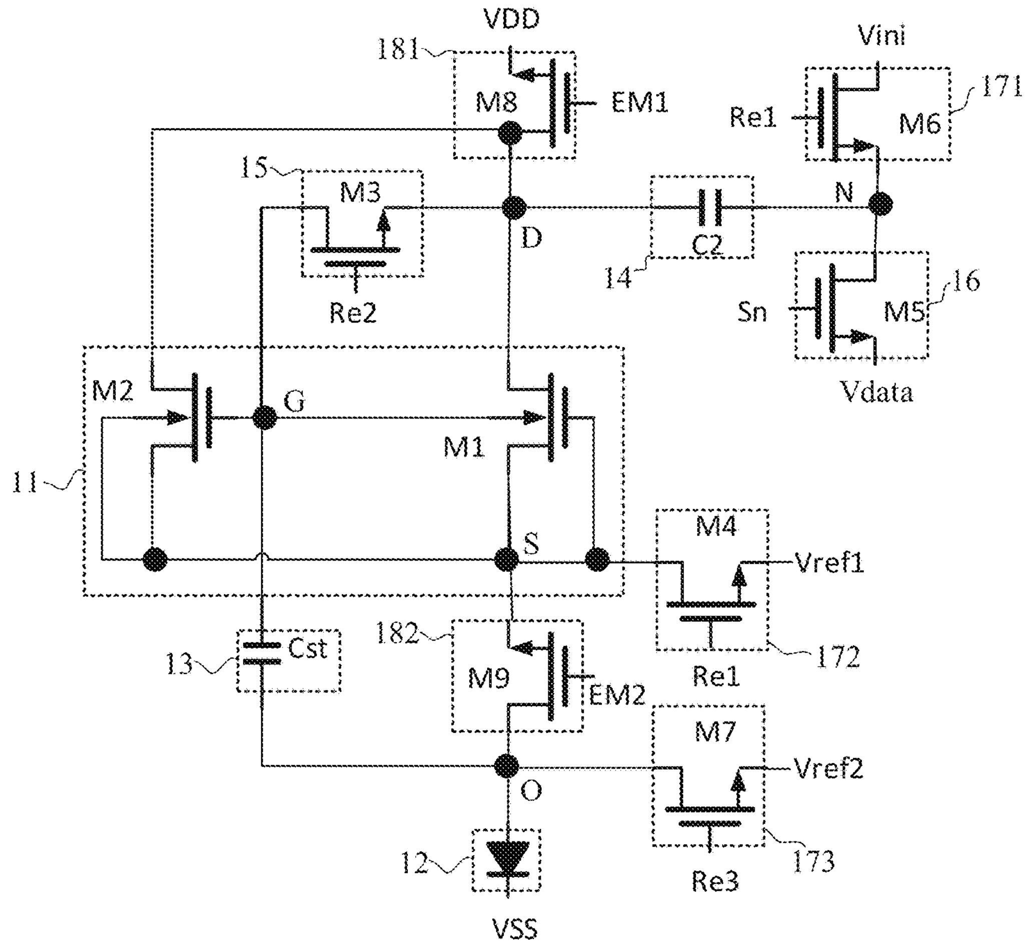
FIG. 5 is a schematic diagram of yet another structure of a pixel circuit according to an embodiment of the present application.

In order to implement low-refresh-rate driving, in some embodiments, as shown in FIG. 5, the control end of the third reset module 173 may be connected to the fourth scan signal Re3. The fourth scan signal Re3 may be independent of the first scan signal Re1, the second scan signal Re2, and the third scan signal Sn. In a first mode, a refresh rate of the fourth scan signal Re3 is greater than a refresh rate of the second scan signal Re2 and a refresh rate of the third scan signal Sn. The first mode may be a low-refresh-rate driving mode.

Figure 6:
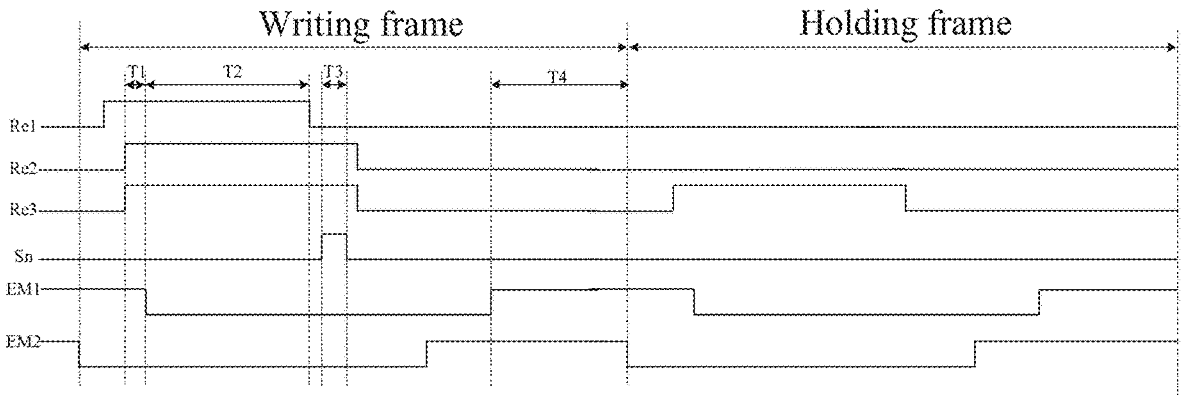
FIG. 6 is a schematic timing diagram of FIG. 5.

With combined reference to FIGS. 5 and 6, in the first mode, one picture refresh period may include a writing frame and at least one holding frame. In the writing frame, the data voltage Vdata is written to the control end of the drive module 11, and in the holding frame, the data voltage Vdata refrains from being written to the control end of the drive module 11.

As an example, the first light-emission control signal EM1 and the second light-emission control signal EM2 may be provided by a set of gate driving circuit, the first scan signal Re1 and the second scan signal Re2 may be provided by another set of gate driving circuit, the fourth scan signal Re3 may be provided by yet another set of gate driving circuit, and the third scan signal Sn may be provided by still another set of gate driving circuit. As such, a total of four sets of gate driving circuits are required. As shown in FIG. 6, in the low-refresh-rate driving mode, the signals EM1, EM2, and Re3 may keep high-rate refreshing, and the signals the Re1, Re2, and Sn may keep low-rate refreshing. That is, the signals Re1, Re2, and Sn may be refreshed only in the writing frame, and may be kept at low levels and thus refrain from being refreshed in the holding frame.

As another example, the first light-emission control signal EM1 and the second light-emission control signal EM2 may be provided by a set of gate driving circuit, the first scan signal Re1 and the fourth scan signal Re3 may be provided by another set of gate driving circuit, the second scan signal Re2 may be provided by yet another set of gate driving circuit, and the third scan signal Sn may be provided by still another set of gate driving circuit. As such, a total of four sets of gate driving circuits are required. In the low-refresh-rate driving mode, the signals EM1, EM2, Re1, and Re3 can keep high-rate refreshing, and the signals Re2 and Sn may keep low-rate refreshing.

Figure 7:
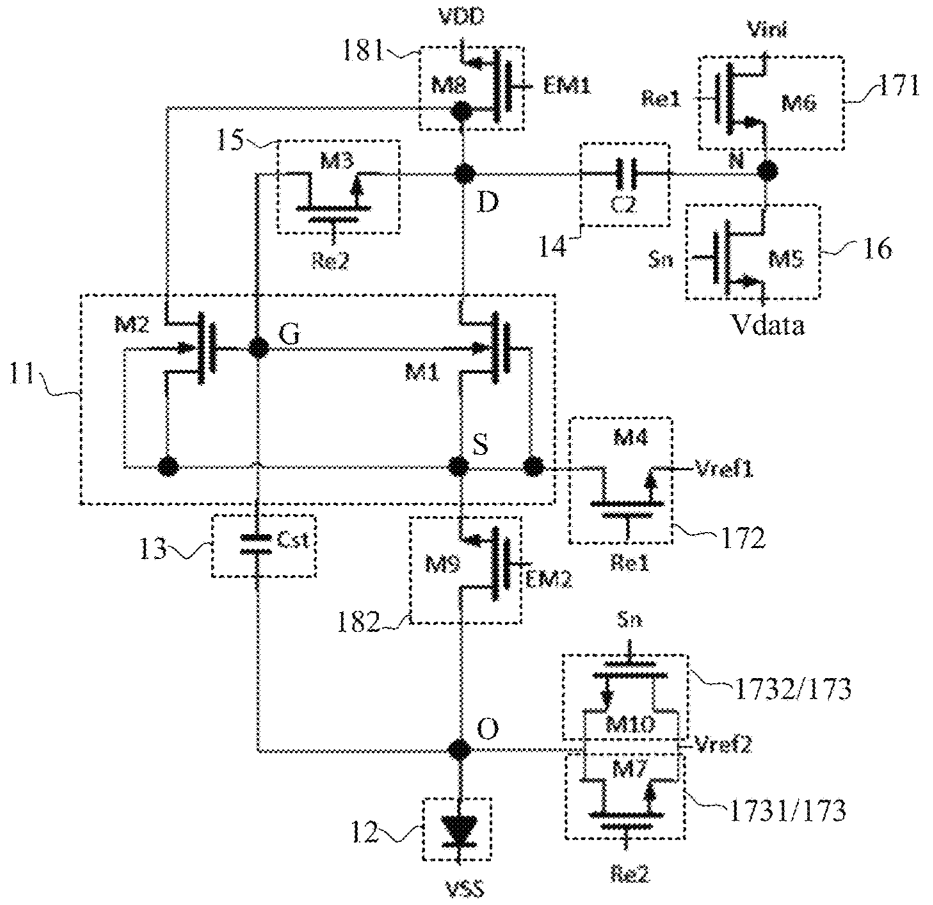
FIG. 7 is a schematic diagram of still another structure of a pixel circuit according to an embodiment of the present application.

In order to implement low-refresh-rate driving, in other embodiments, as shown in FIG. 7, the third reset module 173 may include a first sub-module 1731 and a second sub-module 1732 connected in parallel, where a first end of the first sub-module 1731 is connected to a first end of the second sub-module 1732, a second end of the first sub-module 1731 is connected to a second end of the second sub-module 1732, a control end of the first sub-module 1731 is connected to the second scan signal Re2, and a control end of the second sub-module 1732 is connected to the third scan signal Sn. That is, that first sub-module 1731 and compensation module 15 share the scan signal Re2, and the second sub-module 1732 and the data writing module 16 share the scan signal Sn. In the first mode, the refresh rate of the third scan signal Sn is greater than the refresh rate Re2 of the second scan signal. The first mode may be a low-refresh-rate driving mode.

Figure 8:
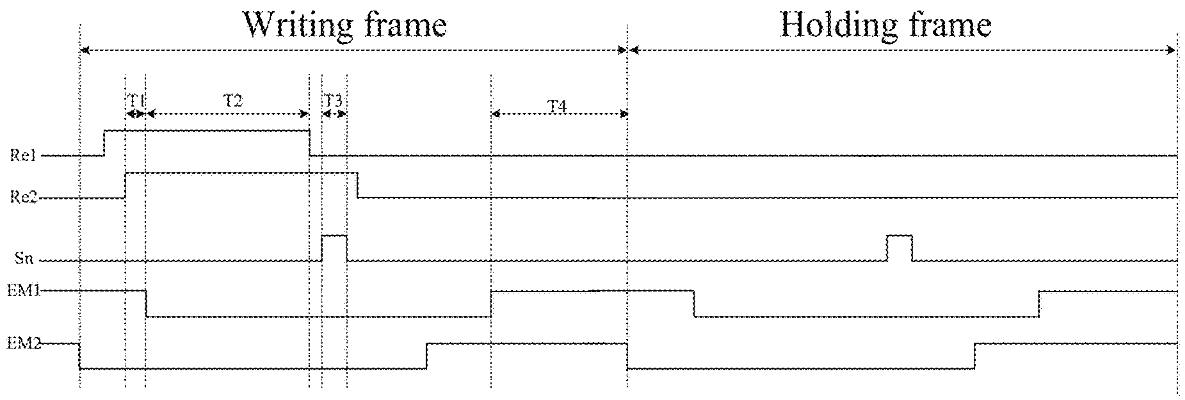
FIG. 8 is a schematic timing diagram of FIG. 7.

With combined reference to FIGS. 7 and 8, in the first mode, one picture refresh period may include a writing frame and at least one holding frame. In the writing frame, the data voltage Vdata is written to the control end of the drive module 11, and in the holding frame, the data voltage Vdata refrains from being written to the control end of the drive module 11.

As an example, the first light-emission control signal EM1 and the second light-emission control signal EM2 may be provided by a set of gate driving circuit, the first scan signal Re1 and the second scan signal Re2 may be provided by another set of gate driving circuit, and the third scan signal Sn may be provided by yet another set of gate driving circuit. As such, a total of three sets of gate driving circuits are required, which is conducive to narrowing the bezel of the display product. As shown in FIG. 8, in the low-refresh-rate driving mode, the signals EM1, EM2, and Sn may keep high-rate refreshing, and the signals Re1 and Re2 may keep low-rate refreshing. That is, the signals Re1 and Re2 may be refreshed only in the writing frame, and may be kept at low levels and thus refrain from being refreshed in the holding frame.

For example, the first sub-module 1731 may include the seventh transistor M7, where the gate of the seventh transistor M7 acts as a control end of the first sub-module 1731, the first terminal of the seventh transistor M7 acts as a first end of the first sub-module 1731, and the second terminal of the seventh transistor M7 acts as a second end of the first sub-module 1731.

The second sub-module 1732 may include a tenth transistor M10, where a gate of the tenth transistor M10 acts as a control end of the second sub-module 1732, a first terminal of the tenth transistor M10 acts as a first end of the second sub-module 1732, and a second terminal of the tenth transistor M10 acts as a second end of the second sub-module 1732.

An embodiment of the present application further provides a method for driving a pixel circuit, where the method is applicable to the pixel circuit as described in any one of the above embodiments.

As shown in FIG. 9, the method for driving a pixel circuit provided in this embodiment of the present application includes step 91.

Step 91: Generate, by both a first transistor and a second transistor, drive currents in a light emitting stage, to drive a light emitting module to emit light, where during display of a first gray scale, the drive current generated in the first transistor is greater than the drive current generated in the second transistor, during display of a second gray scale, the drive current generated in the first transistor is less than the drive current generated in the second transistor, and a gray scale value of the first gray scale is less than a gray scale value of the second gray scale.

According to the method for driving a pixel circuit provided in this embodiment of the present application, the drive module 11 includes two transistors that are connected in parallel and that have different subthreshold swings, where the SS of the first transistor M1 is larger, and the SS of the second transistor is smaller. During display of a low gray scale picture, the first transistor M1 provides a main current, that is, the drive current provided by the first transistor M1 is greater than the drive current provided by the second transistor M2, which is conducive to achieving good brightness uniformity at a low gray scale. During display of a high gray scale picture, the second transistor M2 provides a main current, that is, the drive current provided by the second transistor M2 is greater than the drive current provided by the first transistor M1, which is conducive to achieving a high brightness effect corresponding to a high gray scale. In addition, when both the first transistor M1 and the second transistor M2 are four-end devices, the threshold voltage of the transistor may be stabilized by connecting a gate of the four-end device to a second end of the four-end device, which is more conducive to achieving the brightness uniformity.

In some embodiments, as shown in FIG. 4, an operating process of the pixel circuit may further include a reset stage T1, a compensation stage T2, and a data writing stage T3. Durations of the reset stage T1 and the compensation stage T2 may be adjusted according to a demand.

The longer the duration of the reset stage T1, the larger the power consumption. As an example, the duration of the reset stage T1 of the pixel circuit is less than or equal to a duration of the data writing stage T3. In one embodiment, the duration of the reset stage T1 is less than the duration of the compensation stage T2. As such, the reduction of the power consumption may be facilitated.

As another example, in a second operating condition, in order to control the specific power consumption, the duration of the reset stage T1 may be controlled to be less than a first threshold. The second operating condition may be an operating condition requiring low power consumption, and a specific value of the first threshold may be designed according to a demand.

In the case of poor brightness uniformity of the display product, it is desired to sufficiently reset the pixel circuit and to sufficiently compensate for the threshold voltage of the pixel circuit. For example, in a first operating condition, the duration of the reset stage T1 is greater than the first threshold, the duration of the compensation stage T2 is greater than a second threshold, The first threshold is less than the second threshold. The first operating condition may be an operating condition requiring high brightness uniformity, and a specific value of the second threshold may be designed according to a demand.

An embodiment of the present application further provides a display panel including the pixel circuit as described in any one of the above embodiments.

The display panel provided in this embodiment of the present application has the beneficial effects of the pixel circuit provided in the embodiments of the present application, and reference may be made to the specific description of the pixel circuit in the above embodiments, which is not repeated herein in this embodiment.

The display panel provided in this embodiment of the present application may be an organic light emitting diode (OLED) display panel.

Other embodiments of the present application, the display panel may also be a micro light emitting diode (micro LED) display panel, a quantum dot display panel, etc.

In some embodiments, with combined reference to FIGS. 3 and 10, in the pixel circuit 10, a control end of a first reset module 171 and a control end of a second reset module 172 are connected to a first scan signal Re1, a control end of a compensation module 15 is connected to a second scan signal Re2, a control end of a data writing module 16 is connected to a third scan signal Sn, a control end of a first light-emission control module 181 is connected to a first light-emission control signal EM1, and a control end of a second light-emission control module 182 is connected to a second light-emission control signal EM2. In addition, a control end of a third reset module 173 is connected to the second scan signal Re2.

The display panel 100 may include a first gate driving circuit 201, a second gate driving circuit 202, and a third gate driving circuit 203, the first gate driving circuit 201 is configured to provide the first light-emission control signal EM1 and the second light-emission control signal EM2, the second gate driving circuit 202 is configured to provide the first scan signal Re1 and the second scan signal Re2, and the third gate driving circuit 203 is configured to provide the third scan signal Sn.

In this embodiment of the present application, only three sets of gate driving circuits are required, which is conducive to achieving a narrow bezel of the display panel.

It should be noted that in each embodiment of the present application, the gate driving circuit may include cascaded shift registers, and the cascaded shift registers provide a cascade of gate control signals with enable levels, and rows of pixel circuits can be scanned row by row.

In addition, if two signals from the same gate driving circuit are misaligned temporally, the two signals are generated by different shift registers in the same gate driving circuit. For example, the first light-emission control signal EM1 and the second light-emission control signal EM2 received by the same pixel circuit may be generated by different shift registers in the first gate driving circuit 201.

Figure 11:
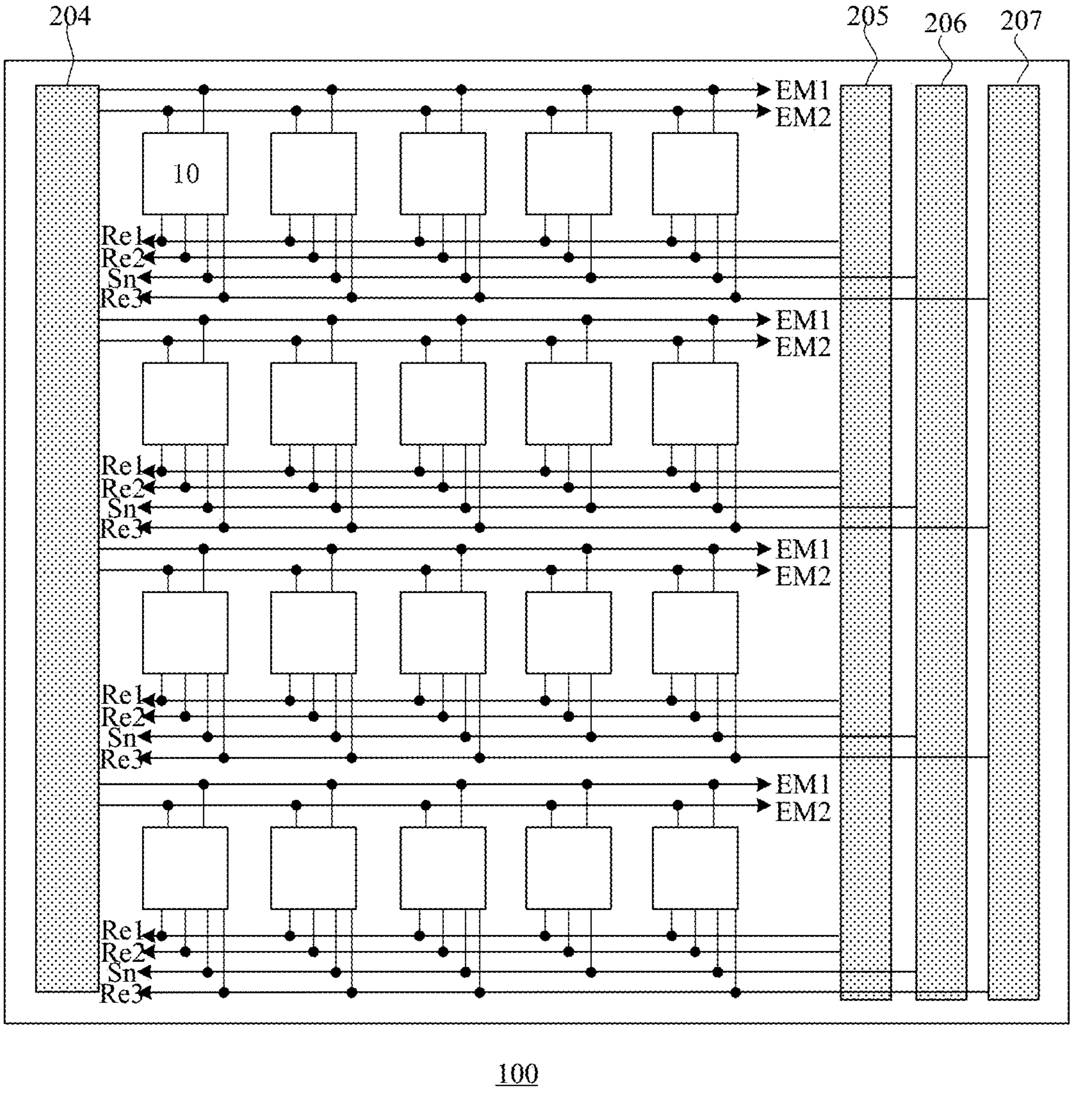
FIG. 11 is a schematic top view of another structure of a display panel according to an embodiment of the present application.

In some embodiments, with combined reference to FIGS. 5 and 11, the same part between FIG. 5 and FIG. 3 is not repeated, and a difference therebetween is that the control end of the third reset module 173 is connected to a fourth scan signal Re3.

As an example, the display panel 100 includes a fourth gate driving circuit 204, a fifth gate driving circuit 205, a sixth gate driving circuit 206, and a seventh gate driving circuit 207, the fourth gate driving circuit 204 is configured to provide the first light-emission control signal EM1 and the second light-emission control signal EM2, the fifth gate driving circuit 205 is configured to provide the first scan signal Re1 and the second scan signal Re2, the sixth gate driving circuit 206 is configured to provide the third scan signal Sn, and the seventh gate driving circuit 207 is configured to provide the fourth scan signal Re3. In this embodiment of the present application, four sets of gate driving circuits are provided, and the fourth scan signal Re3 and the third scan signal Sn are respectively provided by different gate driving circuits, to facilitate low-refresh-rate driving.

For example, the first light-emission control signal EM1 and the second light-emission control signal EM2 provided by the fourth gate driving circuit 204 and the fourth scan signal Re3 provided by the seventh gate driving circuit 207 may keep high-rate refreshing; and the first scan signal Re1 and the second scan signal Re2 provided by the fifth gate driving circuit 205 and the third scan signal Sn provided by the sixth gate driving circuit 206 may keep low-rate refreshing, to implement a low-refresh-rate driving mode.

Figure 12:
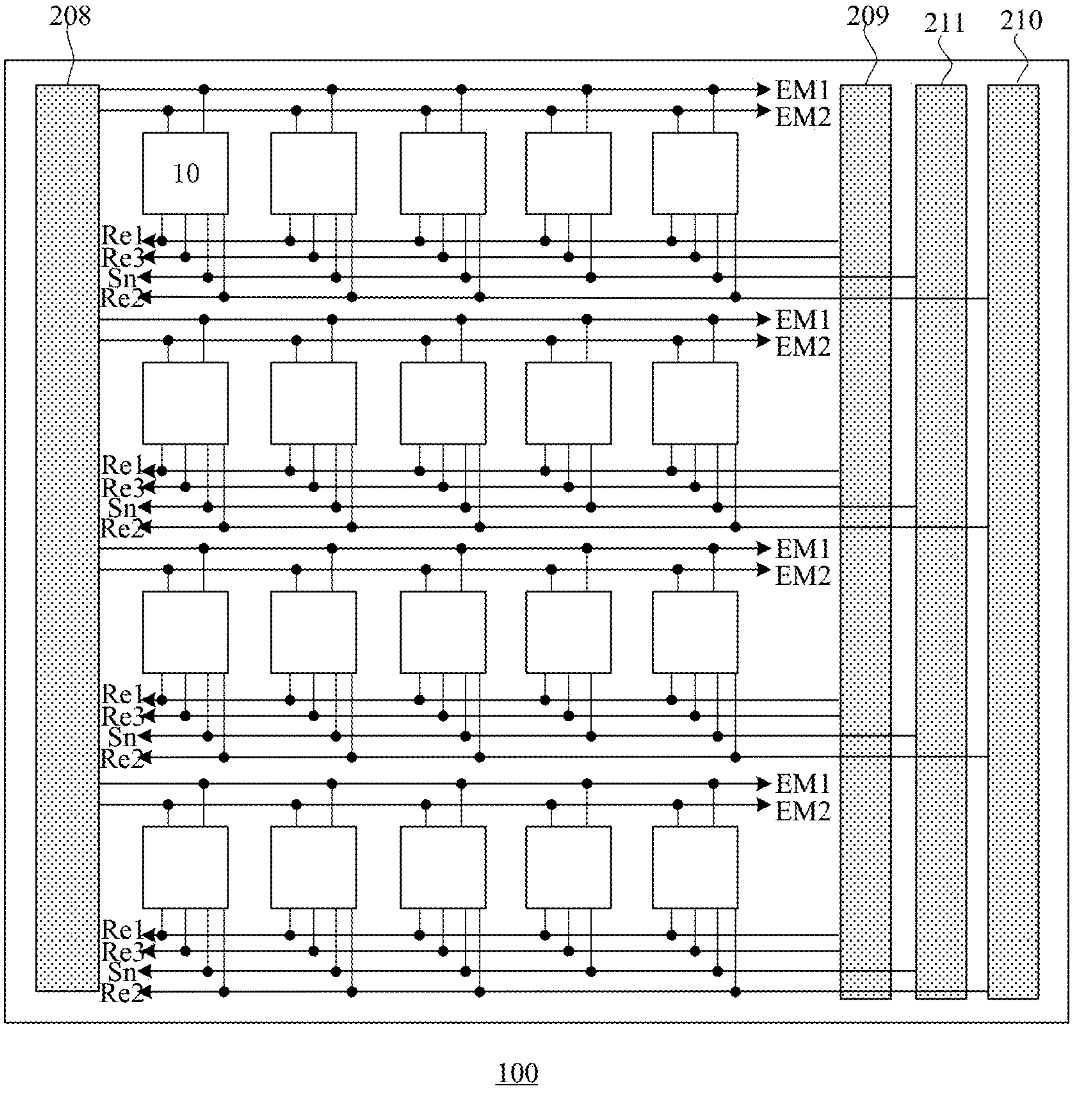
FIG. 12 is a schematic top view of yet another structure of a display panel according to an embodiment of the present application.

As another example, with combined reference to FIGS. 5 and 12, the display panel 100 includes an eighth gate driving circuit 208, a ninth gate driving circuit 209, a tenth gate driving circuit 210, and an eleventh gate driving circuit 211, the eighth gate driving circuit 208 is configured to provide the first light-emission control signal EM1 and the second light-emission control signal EM2, the ninth gate driving circuit 209 is configured to provide the first scan signal Re1 and the fourth scan signal Re3, the tenth gate driving circuit 210 is configured to provide the second scan signal Re2, and the eleventh gate driving circuit 211 is configured to provide the third scan signal Sn. In this embodiment of the present application, four sets of gate driving circuits are provided, the fourth scan signal Re3 and the third scan signal Sn are respectively provided by different gate driving circuits, and the second scan signal Re2 and the third scan signal Sn are respectively provided by different gate driving circuits, to facilitate both low-refresh-rate driving and high-refresh-rate driving.

For example, the first light-emission control signal EM1 and the second light-emission control signal EM2 provided by the eighth gate driving circuit 208 and the first scan signal Re1 and the fourth scan signal Re3 provided by the ninth gate driving circuit 209 may keep high-rate refreshing; and the second scan signal Re2 provided by the tenth gate driving circuit 210 and the third scan signal Sn provided by the eleventh gate driving circuit 211 may keep low-rate refreshing, to implement the low-refresh-rate driving mode.

Figure 13:
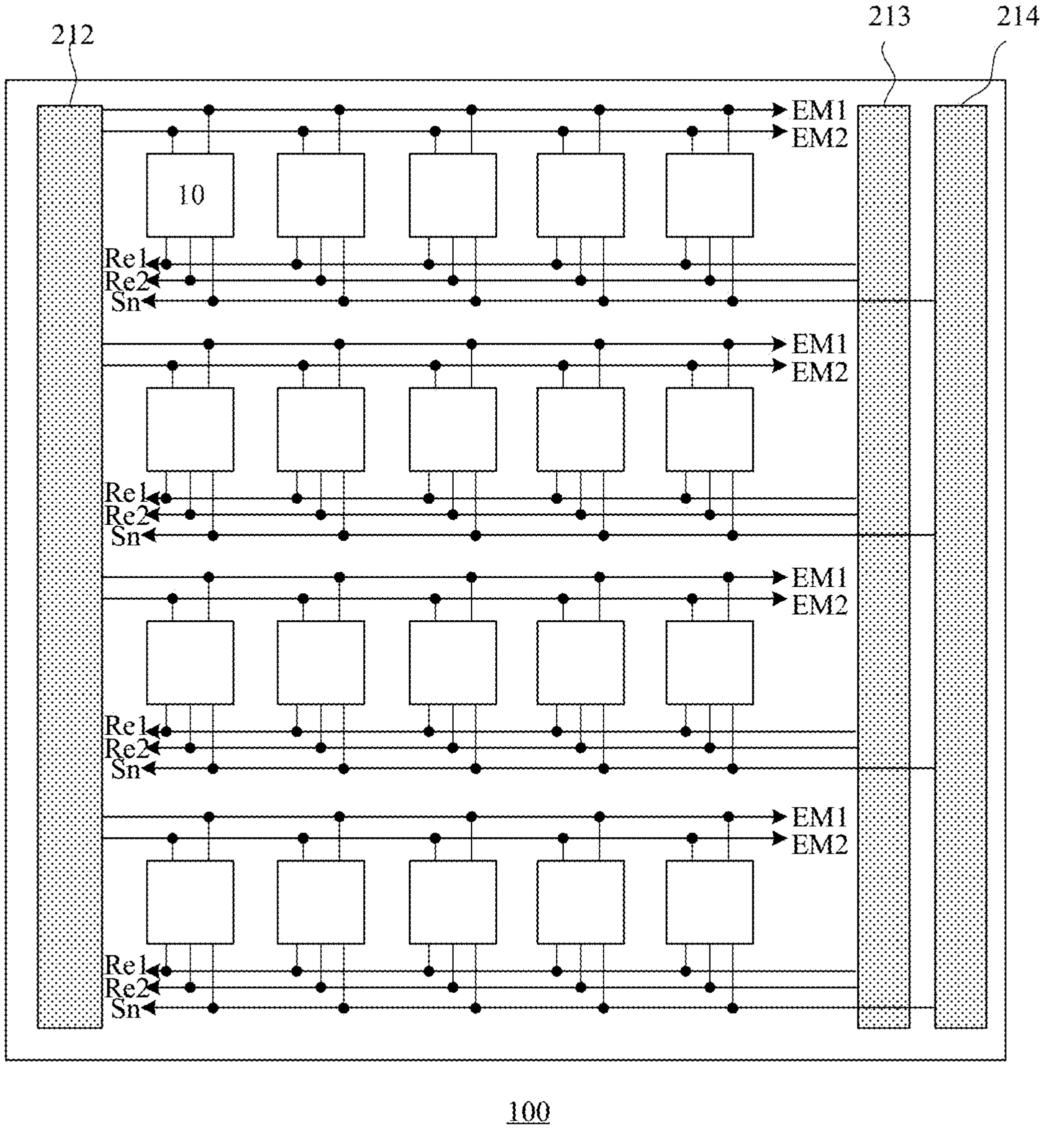
FIG. 13 is a schematic top view of still another structure of a display panel according to an embodiment of the present application.

In some embodiments, with combined reference to FIGS. 7 and 13, the same part between FIG. 7 and FIG. 3 is not repeated, and a difference therebetween is that the third reset module 173 includes a first sub-module 1731 and a second sub-module 1732 connected in parallel, where a control end of the first sub-module 1731 is connected to the second scan signal Re2, and a control end of the second sub-module 1732 is connected to the third scan signal Sn.

The display panel 100 may include a twelfth gate driving circuit 212, a thirteenth gate driving circuit 213, and a fourteenth gate driving circuit 214, the twelfth gate driving circuit 212 is configured to provide the first light-emission control signal EM1 and the second light-emission control signal EM2, the thirteenth gate driving circuit 213 is configured to provide the first scan signal Re1 and the second scan signal Re2, and the fourteenth gate driving circuit 214 is configured to provide the third scan signal Sn. In this embodiment of the present application, three sets of gate driving circuits are provided, and two sub-modules of the third reset module 173 are respectively controlled by different gate driving circuits, to facilitate low-refresh-rate driving while achieving the narrow bezel of the display panel.

For example, the first light-emission control signal EM1 and the second light-emission control signal EM2 provided by the twelfth gate driving circuit 212 and the third scan signal Sn provided by the fourteenth gate driving circuit 214 may keep high-rate refreshing; and the first scan signal Re1 and the second scan signal Re2 provided by the thirteenth gate driving circuit 213 may keep low-rate refresh, to implement the low-refresh-rate driving mode.

For example, the gate driving circuit may be connected to the pixel circuit 10 through a gate trace, and the different signals described above may be transmitted by using different gate traces.

It should be noted that each of the above embodiments is illustrated with an example that all the transistors in the pixel circuit are N-type transistors. In other examples, some or all of the transistors in the pixel circuit to be N-type transistors according to a demand.

For an N-type transistor, an on-level is a high level and an off-level is a low level. That is, when a gate potential of the N-type transistor is at the high level, conduction between a first terminal and a second terminal of the N-type transistor is enabled, and when the gate potential of the N-type transistor is at the low level, conduction between the first terminal and the second terminal of the N-type transistor is disabled. For a P-type transistor, an on-level is a low level and an off-level is a high level. That is, when a gate potential of the P-type transistor is at the low level, conduction between a first terminal and a second terminal of the P-type transistor is enabled, and when the gate potential of the P-type transistor is at the high level, conduction between the first terminal and the second terminal of the P-type transistor is disabled. In a specific implementation, a gate of each transistor described above acts as a control terminal of the transistor, and based on a signal of the gate and the type of each transistor, a first terminal of the transistor may act as a source of the transistor and a second terminal as a drain, or the first terminal as the drain and the second terminal as the source, without making a distinction herein. In addition, in this embodiment of the present application, both the on-level and the off-level refer to general meanings, where the on-level refers to any level that can turn on the transistor, and the off-level refers to any level that can turn off/cut off the transistor.

Figure 14:
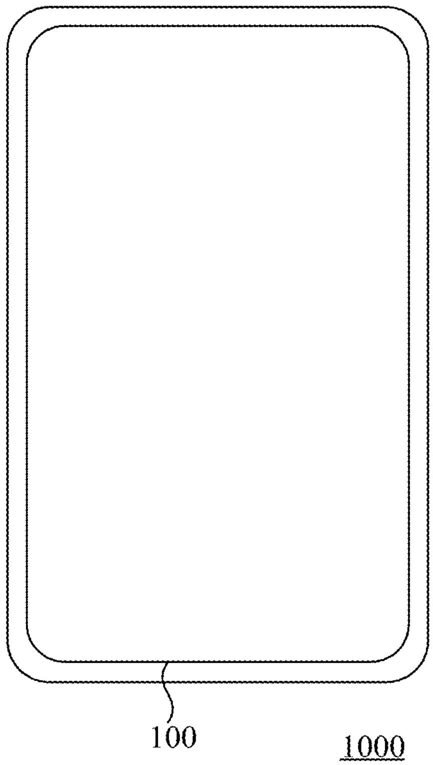
FIG. 14 is a schematic diagram of a structure of a display apparatus according to an embodiment of the present application.

One embodiment of the present application further provides a display apparatus including the display panel provided in the present application. With reference to FIG. 14, FIG. 14 is a schematic diagram of a structure of a display apparatus according to an embodiment of the present application. The display apparatus 1000 provided in FIG. 14 includes the display panel 100 provided in any one of the above embodiments of the present application. In the embodiment of FIG. 14, the display apparatus 1000 is described with a mobile phone as an example only. It may be understood that the display apparatus provided in this embodiments of the present application may be a display apparatus having a display function, such as a wearable product, a computer, a television, or a vehicle-mounted display apparatus, which is not specifically limited in the present application. The display apparatus provided in this embodiment of the present application has the beneficial effects of the display panel provided in the embodiments of the present application, and reference may be made to the specific description of the display panel in the above embodiments, which is not repeated herein in this embodiment.

The embodiments of the present application as described above do not set forth all the details, nor do they limit the present application to the described specific embodiments. Many modifications and variations can be made in light of the above description. The embodiments are selected and described in this specification to better explain the principles and practical applications of the present application, and can make good use of the present application and modify and use the present application. The present application is limited only by the claims and all the scopes and equivalents thereof.

What is claimed is:

1. A pixel circuit, comprising:

a drive module, wherein the drive module comprises a first transistor and a second transistor connected in parallel, a first terminal of the first transistor and a first terminal of the second transistor are connected to form a first end of the drive module, a second terminal of the first transistor and a second terminal of the second transistor are connected to form a second end of the drive module, a first gate of the first transistor and a second gate of the second transistor are connected to form a control end of the drive module, and a subthreshold swing of the first transistor is greater than a subthreshold swing of the second transistor, wherein the first transistor further comprises a third gate disposed opposite the first gate with respect to a channel of the first transistor, and the second transistor further comprises a fourth gate disposed opposite the second gate with respect to a channel of the second transistor, wherein the first gate of the first transistor is a bottom gate of the first transistor, the third gate of the first transistor is a top gate of the first transistor, the second gate of the second transistor is a top gate of the second transistor, and the fourth gate of the second transistor is a bottom gate of the second transistor;

the third gate of the first transistor is connected to the second terminal of the first transistor, and the fourth gate of the second transistor is connected to the second terminal of the second transistor; and an insulating layer between the first gate of the first transistor and an active layer of the first transistor has a thickness of d1, and an insulating layer between the second gate of the second transistor and an active layer of the second transistor has a thickness of d2, wherein d1>d2.

2. The pixel circuit according to claim 1, wherein the first transistor further comprises a third gate disposed opposite the first gate with respect to a channel of the first transistor; or the second transistor further comprises a fourth gate disposed opposite the second gate with respect to a channel of the second transistor.

3. The pixel circuit according to claim 1, further comprising a compensation module, wherein the compensation module is connected between the control end and the first end of the drive module and is configured to transmit a data voltage of the first end of the drive module to the control end of the drive module in a data writing stage and compensate for a threshold voltage of the drive module in a compensation stage.

4. The pixel circuit according to claim 3, wherein a product of a channel width and a channel length of the first transistor is A1, a product of a channel width and a channel length of the second transistor is A2, the compensation module comprises a third transistor, and a product of a channel width and a channel length of the third transistor is A3, where A1<A3, or A2<A3.

5. The pixel circuit according to claim 3, wherein the pixel circuit further comprises a storage module and a coupling module, wherein the storage module is connected between the control end of the drive module and a first end of a light emitting module and is configured to store a voltage of the control end of the drive module; the coupling module is connected to the first end of the drive module and is configured to couple the data voltage to the first end of the drive module; and the storage module comprises a first capacitor, the coupling module comprises a second capacitor, and capacitance of the first capacitor is less than capacitance of the second capacitor.

6. The pixel circuit according to claim 3, further comprising a data writing module, a first reset module, a second reset module, a third reset module, and a light emitting module, wherein the first reset module is connected to a first end of a coupling module and is configured to reset the first end of the coupling module in a reset stage;

the data writing module is connected to the first end of the coupling module and is configured to write the data voltage to the first end of the coupling module in the data writing stage;

a second end of the coupling module is connected to the first end of the drive module, and the coupling module is configured to couple the data voltage to the first end of the drive module;

the second reset module is connected between the second end of the drive module and a first reset signal line and is configured to be turned on in the compensation stage for threshold compensation; and the third reset module is connected between the first end of a light emitting module and a second reset signal line and is configured to reset the first end of the light emitting module.

7. The pixel circuit according to claim 6, wherein a voltage of the first reset signal line is greater than a voltage of the second reset signal line;

a control end of the first reset module and a control end of the second reset module are connected to a first scan signal;

a control end of the compensation module is connected to a second scan signal;

a control end of the data writing module is connected to a third scan signal; and a control end of the third reset module is connected to the second scan signal.

8. The pixel circuit according to claim 6, wherein the control end of the third reset module is connected to a fourth scan signal; and in a first mode, a refresh rate of the fourth scan signal is greater than a refresh rate of a second scan signal and a refresh rate of a third scan signal.

9. The pixel circuit according to claim 6, wherein, the third reset module comprises a first sub-module and a second sub-module connected in parallel, wherein a first end of the first sub-module is connected to a first end of the second sub-module, a second end of the first sub-module is connected to a second end of the second sub-module, a control end of the first sub-module is connected to a second scan signal, and a control end of the second sub-module is connected to a third scan signal; and in the first mode, a refresh rate of the third scan signal is greater than the refresh rate of the second scan signal.

10. The pixel circuit according to claim 6, further comprising a first light-emission control module and a second light-emission control module, wherein the first light-emission control module is connected between the first end of the drive module and a first power supply end and is configured to reset the control end of the drive module in the reset stage and write a voltage of the first power supply end to the drive module in a light emitting stage;

the second light-emission control module is connected between the second end of the drive module and the first end of the light emitting module and is configured to control the light emitting module to emit light in the light emitting stage;

a control end of the first light-emission control module is connected to a first light-emission control signal; and a control end of the second light-emission control module is connected to a second light-emission control signal.

11. The pixel circuit according to claim 10, wherein the second reset module comprises a fourth transistor, the data writing module comprises a fifth transistor, the first reset module comprises a sixth transistor, the first light-emission control module comprises an eighth transistor, and the second light-emission control module comprises a ninth transistor; and the third reset module comprises a seventh transistor, or, a first sub-module comprises a seventh transistor, and a second sub-module comprises a tenth transistor.

12. A method for driving a pixel circuit, which is applied to the pixel circuit according to claim 1, the method comprising:

generating, by both the first transistor and the second transistor, drive currents in a light emitting stage, to drive a light emitting module to emit light, wherein during display of a first gray scale, the drive current generated in the first transistor is greater than the drive current generated in the second transistor, during display of a second gray scale, the drive current generated in the first transistor is less than the drive current generated in the second transistor, and a gray scale value of the first gray scale is less than a gray scale value of the second gray scale.

13. The method according to claim 12, wherein a duration of a reset stage of the pixel circuit is less than or equal to a duration of a data writing stage;

the duration of the reset stage is less than a duration of a compensation stage;

in a first operating condition, the duration of the reset stage is greater than a first threshold, the duration of the compensation stage is greater than a second threshold, and the first threshold is less than the second threshold; and in a second operating condition, the duration of the reset stage is less than the first threshold.

14. A display panel, comprising:

a pixel circuit, comprising:

a drive module, wherein the drive module comprises a first transistor and a second transistor connected in parallel, a first terminal of the first transistor and a first terminal of the second transistor are connected to form a first end of the drive module, a second terminal of the first transistor and a second terminal of the second transistor are connected to form a second end of the drive module, a first gate of the first transistor and a second gate of the second transistor are connected to form a control end of the drive module, and a subthreshold swing of the first transistor is greater than a subthreshold swing of the second transistor, wherein the first transistor further comprises a third gate disposed opposite the first gate with respect to a channel of the first transistor, and the second transistor further comprises a fourth gate disposed opposite the second gate with respect to a channel of the second transistor, wherein the first gate of the first transistor is a bottom gate of the first transistor, the third gate of the first transistor is a top gate of the first transistor, the second gate of the second transistor is a top gate of the second transistor, and the fourth gate of the second transistor is a bottom gate of the second transistor;

the third gate of the first transistor is connected to the second terminal of the first transistor, and the fourth gate of the second transistor is connected to the second terminal of the second transistor; and an insulating layer between the first gate of the first transistor and an active layer of the first transistor has a thickness of d1, and an insulating layer between the second gate of the second transistor and an active layer of the second transistor has a thickness of d2, wherein $d1>d2$.

15. The display panel according to claim 14, wherein a control end of a first reset module and a control end of a second reset module are connected to a first scan signal;

a control end of a compensation module is connected to a second scan signal;

a control end of a data writing module is connected to a third scan signal;

a control end of a first light-emission control module is connected to a first light-emission control signal; and a control end of a second light-emission control module is connected to a second light-emission control signal.

16. The display panel according to claim 15, wherein a control end of a third reset module is connected to the second scan signal; and the display panel comprises a first gate driving circuit, a second gate driving circuit, and a third gate driving circuit, wherein the first gate driving circuit is configured to provide the first light-emission control signal and the second light-emission control signal, the second gate driving circuit is configured to provide the first scan signal and the second scan signal, and the third gate driving circuit is configured to provide the third scan signal.

17. The display panel according to claim 15, wherein the control end of a third reset module is connected to a fourth scan signal;

the display panel comprises a fourth gate driving circuit, a fifth gate driving circuit, a sixth gate driving circuit, and a seventh gate driving circuit, wherein the fourth gate driving circuit is configured to provide the first light-emission control signal and the second light-emission control signal, the fifth gate driving circuit is configured to provide the first scan signal and the second scan signal, the sixth gate driving circuit is configured to provide the third scan signal, and the seventh gate driving circuit is configured to provide the fourth scan signal; or, the display panel comprises an eighth gate driving circuit, a ninth gate driving circuit, a tenth gate driving circuit, and an eleventh gate driving circuit, wherein the eighth gate driving circuit is configured to provide the first light-emission control signal and the second light-emission control signal, the ninth gate driving circuit is configured to provide the first scan signal and the fourth scan signal, the tenth gate driving circuit is configured to provide the second scan signal, and the eleventh gate driving circuit is configured to provide the third scan signal.

18. The display panel according to claim 15, wherein a third reset module comprises a first sub-module and a second sub-module connected in parallel, a control end of the first sub-module is connected to the second scan signal, and a control end of the second sub-module is connected to the third scan signal; and the display panel comprises a twelfth gate driving circuit, a thirteenth gate driving circuit, and a fourteenth gate driving circuit, wherein the twelfth gate driving circuit is configured to provide the first light-emission control signal and the second light-emission control signal, the thirteenth gate driving circuit is configured to provide the first scan signal and the second scan signal, and the fourteenth gate driving circuit is configured to provide the third scan signal.

* * * * *